United States Patent

Ghosh

Patent Number: 5,990,031
Date of Patent: Nov. 23, 1999

[54] ZEOLITE CATALYST WITH ENHANCED DEALKYLATION ACTIVITY AND METHOD FOR PRODUCING SAME

[75] Inventor: Ashim Kumar Ghosh, Houston, Tex.

[73] Assignee: Fina Technology, Inc., Dallas, Tex.

[21] Appl. No.: 08/753,582

[22] Filed: Nov. 26, 1996

[51] Int. Cl.$^6$ ............................. B01J 29/064; B01J 29/20
[52] U.S. Cl. ................................ 502/66; 502/64; 502/74; 502/78; 502/85
[58] Field of Search ................................. 502/64, 66, 74, 502/78, 85

[56] References Cited

U.S. PATENT DOCUMENTS

| | | | |
|---|---|---|---|
| 3,619,412 | 11/1971 | Clement et al. | 502/78 |
| 5,215,736 | 6/1993 | Caullet et al. | 502/66 |

OTHER PUBLICATIONS

"Fluorine–Promoted Catalyst", By Ashim Ghosh and Ron Kydd, Catalysis Reviews, 27(4) 539–589 (1985).
"Acidity and Activity fof Fluorinated Mordenites", by Ashim Ghosh and Ron Kydd, Journal fo Catalysis, 103, 399–406 (1987).
"An Infrared Study of the effect of HF treatment on the acidity of ZSM–5", by Ashim Ghosh and Ron Kydd, Zeolite, 10, 766–771(1990).

Primary Examiner—Thomas Dunn
Attorney, Agent, or Firm—Pamela S. Smith; William D. Jackson; M. Norwood Cheairs

[57] ABSTRACT

An improved zeolite catalyst having enhanced dealkylation activity is provided. The catalyst is prepared by incorporating fluorine into the zeolite structure. In another embodiment, a transition element such as nickel is additionally incorporated into the zeolite structure. The process for producing the catalyst also includes ion-exchange and calcining steps. A mordenite type catalyst has been found to be particularly effective. The catalyst of the present invention demonstrates improved activity for the dealkylation of polyalkylaromatic compounds found in residue from the alkylation process and in heavy reformate streams from refineries. A dealkylation process using the catalyst of the present invention is provided. The dealkylation process shows good selectivity for benzene and monoalkylated aromatic products, and catalyst stability, particularly at high reaction temperatures.

19 Claims, 1 Drawing Sheet

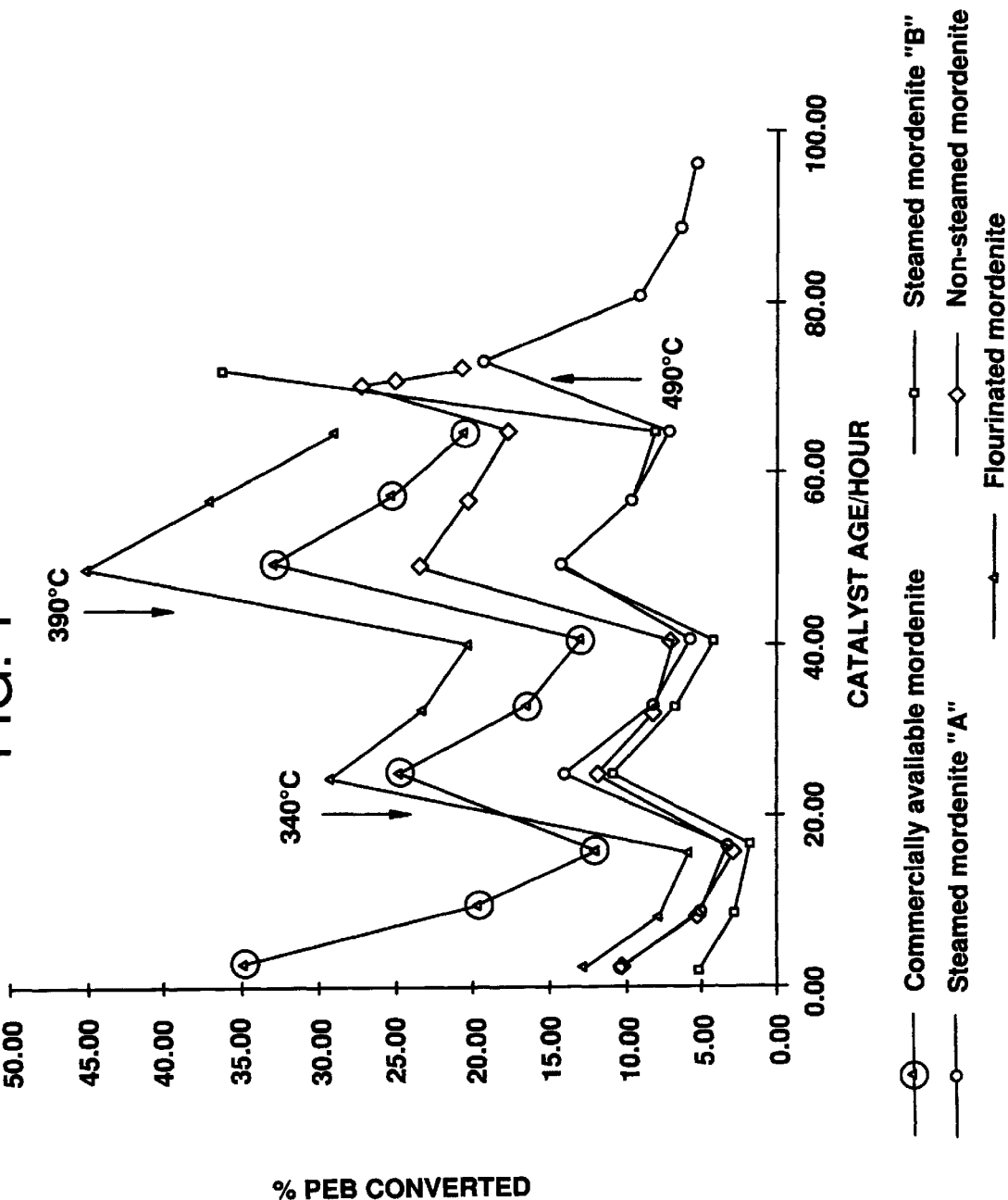

ZEOLITE CATALYST WITH ENHANCED DEALKYLATION ACTIVITY AND METHOD FOR PRODUCING SAME

The present invention relates to an improved zeolite catalyst having enhanced activity for dealkylation. The catalyst is prepared by a process which includes a fluoridation step and may, additionally incorporate metal ions into the crystalline structure of the catalyst. The catalyst of the present invention shows improved activity for the dealkylation of polyalkylaromatic residue produced in the alkylation process or found in a refinery heavy reformate stream.

BACKGROUND OF THE INVENTION

Zeolite catalysts are widely used to promote various processes in the petrochemical industry. These catalysts have been found to be useful, for example, in alkylation, dealkylation, transalkylation, isomerization, cracking, disproportionation and dewaxing processes. Zeolites occur in nature or may be synthesized.

Zeolites are alumino-silicates having defined, ordered crystalline structures in which there are pores or cavities of a definite size. The dimensions of the pores permit some molecules to enter for adsorption and catalysis while excluding other molecules. Thus, a zeolite catalyst can be selected that will promote specific reactions while preventing others. The adsorption properties of the zeolite may be altered by treating the zeolite to add or remove molecules from the crystalline lattice.

U.S. Pat. No. 3,251,897 to Wise discloses the alkylation of hydrocarbons in the presence of a catalyst prepared from alumino-silicates having base-exchanged metal sites and/or acid exchanged hydrogen sites to enhance catalytic activity. The preferred metals are the rare earths; for example, lanthanum, cerium and praseodymium.

U.S. Pat. No. 3,631,120 to Eberly et al. discusses the treatment of crystalline zeolites with alkaline solutions and subsequent ion-exchange with ammonium salts to enhance the activity of the zeolitic catalysts.

It is known in the art that the activity of alumina-based catalysts is enhanced by fluorination. The fluoride ion is thought to replace surface oxide or hydroxide groups, and because fluorine is very electronegative, it polarizes the framework of the catalyst, thereby increasing the acidity and reactivity of the surface. (Ghosh, A. K. and Kydd, R. A., "Fluorine-Promoted Catalysts" *Catal. Rev. Sci. Eng.*, 1985, Vol. 27, p. 539.) Certain types of fluorine treatment have also been found to increase the acidity of siliceous zeolites such as ZSM-5. Mild fluorination of ZSM-5 was found to increase the catalysts n-butane cracking ability, although severe fluorination was found to decrease it. (Lok, B. M. Goertsma, F. P., Messina, C. A., and Izod, T. P. J.,*Am. Chem. Soc. Conf. Preprints,* 1985, Vol. 22, p. 470.)

Fluorination may be accomplished by exposing the catalyst to the vapors of fluorine-containing compounds such as $F_2$, HF or $NH_4F$ at elevated temperature or saturating the catalyst with an aqueous solution containing an effective amount of a fluorine-containing compound such as HF, $BF_3$, or $HBF_4$. The latter fluorination is usually carried out at room temperature. (Ghosh et al., P 540–541.) X-ray diffraction studies indicate that the zeolites are dealuminated during the fluoridation process. (Id. at p.545)

One zeolite found to be useful in petrochemical catalysis is mordenite, which can be found in nature or synthesized. Mordenite comprises a crystalline structure of chains of 5-membered rings of tetrahedra and has a silicon-to-aluminum ratio of about 5 to 1. It is theorized that mordenite has a series of channels having diameters of 4 to 6.6 Angstroms which are interconnected by smaller channels with diameters of about 2.8 Angstroms. One problem in the industrial use of mordenite is that large molecules, polyalkylaromatics for example, can not enter the channels and cavities of the port structure, limiting its usefulness as a catalyst.

The fluorinated zeolite catalysts discussed above do not provide the enhanced activity and stable structure needed for commercial catalysts because of unsuitable pore size distribution. Specifically, a catalyst is needed for dealkylation that is capable of dealkylating polyalkylaromatic compounds under commercial conditions to give high yields of commercially desirable products such as benzene and ethylbenzene.

SUMMARY OF THE INVENTION

The present invention provides a zeolite catalyst with enhanced pore sizes, resulting in higher activity levels for reactions such as dealkylation. The process for producing the catalyst includes the steps of: 1) subjecting an "as synthesized" siliceous zeolite powder to ion-exchange with ammonium ion 2) calcining the $NH_4$-zeolite powder 3) subjecting the calcined powder to a second ion-exchange with ammonium ion 4) treating the $NH_4$-zeolite with a fluorine containing agent 5) binding the fluorinated zeolite powder with a refractory oxide and 6) calcining the bound, fluorinated zeolite to yield the catalyst. In one embodiment, metal ions, for example nickel, may be incorporated into the zeolite crystalline structure after the fluorination step.

The catalyst of the present invention was found to have a significantly higher activity for the dealkylation of polyalkylaromatics than untreated catalysts. A dealkylation process using a fluorinated mordenite catalyst is also disclosed.

BRIEF DESCRIPTION OF THE DRAWING

FIG. 1 shows the percent PEB residue conversion as a function of catalyst age and reaction temperature.

DETAILED DESCRIPTION OF THE INVENTION

Zeolite catalysts are used in the petrochemical industry for varied processes, including alkylation, transalkylation, dealkylation, dewaxing, isomerization, disproportionation and the like. The crystalline structure of a zeolite catalyst may be modified to enhance various facets of the catalyst behavior.

The present invention provides a method for increasing the dealkylation activity of a zeolite-type catalyst using sequential treatment steps, including at least one step wherein the zeolite is subjected to fluorination. The fluorinated catalyst of the present invention may be prepared by modifying an "as synthesized" zeolite catalyst, for example, ZSM-5, mordenite, zeolite omega, or zeolite beta. Although the invention will be illustrated by describing it in terms of mordenite, it should be understood that the invention is not so limited.

The as-synthesized zeolite is first subjected to an ion-exchange treatment with an ammonium ion containing solution. Ion-exchange techniques are well known in the art. Typically, the zeolite is contacted with an aqueous solution of the salt of the desired replacing ion. Chlorides, nitrates and sulfates have been shown to be particularly useful in this regard. In the present invention, the zeolite is ion-exchanged with an solution containing the ammonium ion. The resulting NH$_4$-zeolite powder is calcined between 450° C. and 750° C., preferably between 550–570° C.

The calcined powder is then subjected to a second ion-exchange treatment with an ammonium ion containing solution, similar to the ion-exchange step described above.

After the second ion-exchange step, the NH$_4$ zeolite is treated with an aqueous solution of a fluoride ion containing compound, for example ammonium fluoride. The treatment takes place at about 20 to 80° C., preferably about 25° C. Other fluorine-containing compounds that may be used in the fluorination step include BF$_3$, HBF$_3$ and NH$_4$BF$_4$.

The fluorinated zeolite powder is then mixed with a refractory oxide binder, for example alumina, and pelletized. The pellets are then calcined at 450° C. to 650° C., preferably 520–540° C. This final calcination removes ammonium ions from the reaction sites and places the catalyst in the active form. A detailed account of the synthesis of the catalyst of the present invention is given in Example 1 in which mordenite is used as the base catalyst.

In another embodiment of the present invention, metal ions such as Ni$^{2+}$ may be incorporated into the crystalline structure of the catalyst. Although nickel ions are used by way of example, it should be understood that other Group VIII transition metals such as cobalt and palladium may be substituted for the nickel. Typically the catalysts of this embodiment contain 1–2% by weight nickel. The procedure for producing a mordenite catalyst according to this embodiment is shown in Example 2.

In the alkylation of an aromatic compound such as benzene with an olefin such as ethylene, a portion of the aromatic feedstock is converted to polyalkylaromatics instead of the monoalkylated product desired. This stream is known as PEB residue, and is usually used as a fuel or otherwise disposed of. This represents a loss of valuable feedstock to the manufacturer.

One alternative to disposing of the PEB residue is to dealkylate the aromatic ring to give either benzene or an aromatic compound having desired monoalkyl groups. The process is likewise applicable to breaking down the complex aromatic compounds found in a heavy reformate cut at a refinery.

Mordenite, a zeolite having a structure based on chains of five-member rings has shown promise as a catalyst for dealkylation.

Mordenite catalyst is available from commercial manufacturers, for example the Union Carbide Corporation. U.S. Pat. No. 4,085,156 to Frilette, which is incorporated by reference, gives a method of activating naturally occurring mordenite. While various treatments have been used to modify the site and degree of the acidity of the mordenite catalyst, these treatments may reduced the stability of the catalyst. Of these methods, steaming is more often used for modifying zeolite acidity.

It has been shown that the fluorinated catalysts produced by the present invention have increased dealkylation activity. Example 3 shows five mordenite based catalysts that were tested for dealkylation activity; one commercially available mordenite, two steam dealuminated, laboratory synthesized mordenites; one non-steamed, laboratory synthesized mordenite and one fluorinated mordenite produced by the process of the present invention. Steam dealumination is a commonly used technique to enhance the activity level of the catalyst. Each catalyst contained 1–2% by weight nickel.

Before testing, each catalyst sample was dried at 200° C. under hydrogen flow for eight hours, followed by further drying at 400° C. for four hours, then cooled to 300° C. Feed, consisting of PEB residue, was then introduced into a test reactor for dealkylation. Detailed reactor conditions are shown in Table I.

FIG. 1 shows the percent of PEB residue converted to more useable, mono- or unsubstituted aromatic compounds for each of the five catalyst samples. The conversion is presented as a function of catalyst age. The commercial mordenite catalyst showed a conversion rate of about 35% at 287–295°, but somewhat less conversion at temperatures approaching 500° C. The commercial catalyst also deactivated rapidly, especially at higher temperatures. Note that the percent conversion fell from about 35% to about 13% in 16 hours, even at 290° C. This rapid deactivation is even more pronounced at the higher temperatures. The steamed mordenite catalysts and the "as synthesized" mordenite (not steamed) showed little or no improvement over the commercial product.

The fluorinated nickel mordenite of the present invention showed a lower conversion rate at 290° C. when compared to the commercial catalyst, but significantly better conversion rates at higher temperatures. It should also be noted from Table II that the selectivity for benzene and ethylbenzene remained high over a significant portion of the temperature range tested. The selectivity is particularly important for commercial alkylation processes where benzene is a feedstock and ethylbenzene, a styrene precursor, is the desired product.

EXAMPLE 1

The "as synthesized" mordenite was submersed in an aqueous solution of ammonium nitrate having a normality of 2. The ratio of zeolite to ammonium nitrate was about 1:1 by weight The ion-exchange treatment was continued for approximately two hours at 85–100° C. with mild agitation. The resulting ammonium zeolite was filtered, washed with deionized water and dried at 110° C. for at least two hours.

The dried ammonium mordenite powder was then calcined at 550–570° C. to burn the organic template. The calcined powder was further subjected to another ammonium ion-exchange step identical to the one above and then dried at 110° C.

The ammonium zeolite powder was then fluorinated. A dried ammonium mordenite sample weighing 102.3 grams was suspended in 500 milliliters deionized water in a teflon container. A salt solution of ammonium fluoride was prepared by dissolving 0.74 gm. of NH$_4$F in 200 milliliters deionized water. The salt solution was slowly added to the zeolite suspension at a temperature of about 25° C. The suspended zeolite was stirred for about three hours. The fluorinated mordenite was filtered, washed and dried at 110° C.

The fluorinated mordenite powder was then subjected to ion-exchange with Ni-ions. About 68 grams of the dried, fluorinated mordenite powder was suspended in deionized water. A salt solution of nickel nitrate was prepared by dissolving 2.83 gm. of Ni(NO$_3$)$_2$ in 200 milliliters deionized water. The salt solution was slowly added to the zeolite suspension at a temperature of about 85–100° C. and the reaction continued for about three hours. The nickel-exchanged mordenite was then filtered, washed and dried at 110° C. The resulting nickel exchanged and fluorine treated mordenite was then mulled with nitric acid treated alumina and extruded into 1/16 inch pellets. The resulting extruded pellets were then calcined in an oven under air to a temperature of about 530° C.

EXAMPLE 2

One commercially available and four laboratory synthesized nickel mordenite catalysts were tested for dealkylation activity in an automated reactor. The extruded (1/16") catalyst pellets were sized to 10–20 mesh. Ten milliliters of the catalyst to be tested was loaded into a 50 ml reactor. Inert denstone was used to fill the dead space within the reactor. Five thermocouples were inserted at varying depths of the catalyst bed to monitor the reaction temperature.

The reactor was leak tested, then heated to 200° C. for eight hours under hydrogen flow (0.3 l/min.) at a pressure of 600 psig. The temperature in the reactor was then raised to 400° C. to further dry the catalyst for four hours under continued hydrogen flow. The reactor was allowed to cool to 300° C., at which point the feed, PEB residue, was introduced. The PEB feed was obtained from a plant scale alkylation unit used in the production of ethylbenzene. Heavies, hydrocarbons with molecular weights in excess of 134, made up 99 percent of the feed. Hydrogen cofeed was continued.

The following are the reactor operating parameters for the dealkylation activity testing:

TABLE I

Dealkylation Test Reactor Conditions

| | |
|---|---|
| Catalyst Volume | 10 ml |
| Catalyst Size | 10–20 mesh |
| Reactor Mode | Down flow |
| System Pressure | 600 psig |
| Reactor Set Temp/° C. | Initial 300° C., raised to 350°, 400° & 500° C. |
| Feed Composition | PEB Residue |
| Feed Rate | 3.4 ml/min |
| LHSV | 20 hr$^{-1}$ |
| H2 Flow Rate | 0.65 L/min |
| H2/HC Mole Ratio | 1:2 |

At each set temperature, three effluent samples were collected and analyzed to calculate the conversion of heavies present in the PEB residue and the conversion product distribution.

TABLE II

PEB Conversion and Product Selectivities

| Catalyst | Conv/ Sel, wt % | 287–295 | 337–341 | 387–392 | 487–495 |
|---|---|---|---|---|---|
| Commer- | PEBR Conv | 34.91 | 25.03 | 32.98 | |
| cially | Benzene Sel | 50.36 | 55.90 | 52.64 | |
| Available | EB Sel | 37.35 | 35.00 | 35.93 | |
| Mordenite | Toluene Sel | 2.21 | 1.60 | 2.37 | |
| | DEB Sel | 4.87 | 4.91 | 4.76 | |
| Steamed | PEBR Conv | 10.30 | 13.88 | 14.14 | 18.93 |
| Mordenite | Benzene Sel | 64.17 | 62.90 | 48.51 | 39.46 |
| A | EB Sel | 30.29 | 30.69 | 34.94 | 34.23 |
| | Toluene Sel | 2.04 | 1.59 | 8.06 | 12.41 |
| | DEB Sel | 3.69 | 3.39 | 5.66 | 5.18 |
| Steamed | PEBR Conv | 5.21 | 10.65 | 13.95 | 36.36 |
| Mordenite | Benzene Sel | 61.61 | 61.69 | 41.58 | 14.66 |
| B | EB Sel | 32.44 | 30.52 | 31.25 | 11.19 |
| | Toluene Sel | 2.30 | 1.60 | 11.90 | 53.42 |
| | DEB Sel | 5.76 | 3.94 | 6.02 | 3.55 |
| Non- | PEBR Conv | 10.19 | 11.71 | 23.34 | 27.27 |
| Steamed | Benzene Sel | 47.69 | 53.37 | 57.41 | 37.62 |
| Mordenite | EB Sel | 22.28 | 26.99 | 30.93 | 16.35 |
| | Toluene Sel | 20.90 | 8.63 | 3.08 | 27.47 |
| | DEB Sel | 3.14 | 3.67 | 3.81 | 4.77 |
| Fluor- | PEBR Conv | 12.79 | 29.52 | 45.29 | 29.54 |
| inated | Benzene Sel | 61.92 | 61.31 | 54.91 | 33.04 |
| Mordenite | EB Sel | 27.68 | 26.56 | 24.86 | 15.13 |
| | Toluene Sel | 6.25 | 2.13 | 3.80 | 25.39 |
| | DEB Sel | 3.52 | 2.81 | 2.78 | 3.96 |

While the invention has been described in connection with the foregoing examples, it will be appreciated by those skilled in the art that the invention is subject to variations and modifications which fall within the scope of the appended claims and which are intended to be covered thereby.

What is claimed:

1. A process for increasing the dealkylation activity of a zeolite catalyst comprising the steps of:
    (a) treating a zeolite catalyst with an ion-exchange medium to activate a portion of active sites in said zeolite catalyst;
    (b) calcining under anhydrous conditions the ion-exchanged zeolite catalyst of (a) at a temperature within the range of 400°–700° C. for a period within the range of 2–10 hours;
    (c) treating the calcined zeolite catalyst of (b) with an ion-exchange medium to activate an additional portion of active sites in said zeolite;
    (d) incorporating fluorine into said zeolite catalyst by treating the ion-exchanged zeolite catalyst from (c) with a medium comprising a fluorine-containing salt solution;
    (e) mixing the fluorine containing zeolite catalyst of (d) with a binder;
    (f) pelletizing the zeolite catalyst binder mixture of (e); and
    (g) calcining under anhydrous conditions the pelletized zeolite catalyst binder mixture of (f) at 400°–700° C. for 2–10 hr.

2. The process of claim 1 wherein the ion-exchanged zeolite catalyst is calcined in step (b) at a temperature ranging from 550°–570° C. for a period of 6 hrs.

3. The process of claim 1 wherein the pelletized zeolite catalyst binder mixture is calcined in step (g) at a temperature ranging from 520–540° C. for a period of 2 hrs.

4. The process of claim 1 further including the step of incorporating a transition metal into the zeolite catalyst by treating the fluorinated zeolite catalyst of step (d) with an ion-exchange medium comprising a transition metal salt solution.

5. The process of claim 4 wherein the ion-exchange medium is an aqueous solution of a nickel salt.

6. The process of claim 5 wherein the nickel salt is nickel nitrate.

7. The process of claim 5 wherein 1–2% by weight nickel is incorporated into the zeolite catalyst.

8. The process of claim 1 wherein the ion-exchange medium of step (a) is an aqueous solution of an ammonium salt.

9. The process of claim 8 wherein the ammonium salt is ammonium nitrate.

10. The process of claim 1 wherein the ion-exchange medium of step (c) is an aqueous solution of an ammonium salt.

11. The process of claim 10 wherein the ammonium salt is ammonium nitrate.

12. The process of claim 1 wherein the zeolite is mordenite.

13. A catalyst having enhanced activity wherein the catalyst is produced by the steps of:
   (a) treating a zeolite catalyst with an ion-exchange medium to activate a portion of active sites in said zeolite catalyst;
   (b) calcining under anhydrous conditions the ion-exchanged zeolite catalyst of (a) at a temperature within the range of 400°–700° C. for a period within the range of 2–10 hours;
   (c) treating the calcined zeolite catalyst of (b) with an ion-exchange medium to activate an additional portion of active sites in said zeolite.
   (d) incorporating fluorine into said zeolite by treating the ion-exchanged zeolite catalyst from (c) with a medium comprising a fluorine-containing salt solution;
   (e) mixing the fluorine-containing zeolite catalyst of (d) with a binder;
   (f) pelletizing the zeolite catalyst binder mixture of (e); and
   (g) calcining under anhydrous conditions the pelletized zeolite catalyst binder mixture of (f) at 400°–700° C. for 2–10 hours.

14. The catalyst of claim 13 produced by a process further including the step of incorporating a transition metal into the zeolite catalyst by treating the fluorinated zeolite catalyst of step (d) with an ion-exchange medium comprising a transition metal salt solution.

15. The catalyst of claim 14 wherein the ion-exchange medium is an aqueous solution of nickel salt.

16. The catalyst of claim 15 wherein the nickel salt is nickel nitrate.

17. The catalyst of claim 13 wherein the ion-exchange medium of step (a) is an aqueous solution of an ammonium salt.

18. The catalyst of claim 17 wherein the ammonium salt is ammonium nitrate.

19. The catalyst of claim 13 wherein the zeolite is mordenite.

* * * * *